(12) United States Patent
Vange (10) Patent No.: US 9,089,768 B2
(45) Date of Patent: Jul. 28, 2015

(54) METHOD AND SYSTEM FOR REMOTE GAME DISPLAY

(75) Inventor: Mark Vange, Scottsdale, AZ (US)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 13/437,748

(22) Filed: Apr. 2, 2012

(65) Prior Publication Data

US 2012/0252576 A1 Oct. 4, 2012

Related U.S. Application Data

(60) Provisional application No. 61/471,008, filed on Apr. 1, 2011, provisional application No. 61/471,068, filed on Apr. 1, 2011, provisional application No. 61/471,131, filed on Apr. 2, 2011, provisional application No. 61/471,133, filed on Apr. 2, 2011, provisional application No. 61/481,972, filed on May 3, 2011.

(51) Int. Cl.
*A63F 13/00* (2014.01)
*A63F 13/20* (2014.01)
*A63F 13/90* (2014.01)

(52) U.S. Cl.
CPC ............. *A63F 13/06* (2013.01); *A63F 13/08* (2013.01); *A63F 2300/204* (2013.01); *A63F 2300/301* (2013.01)

(58) Field of Classification Search
USPC .............................. 463/16–20, 25, 30, 36–43
See application file for complete search history.

(56) References Cited

U.S. PATENT DOCUMENTS

| 2005/0101383 | A1* | 5/2005 | Wells | 463/39 |
| 2008/0102916 | A1* | 5/2008 | Kovacs et al. | 463/16 |

* cited by examiner

*Primary Examiner* — Sunit Pandya
(74) *Attorney, Agent, or Firm* — Knobbe Martens Olson & Bear LLP (57) ABSTRACT

Various embodiment provide a method of interfacing an application controller with a remote display. The method can include the steps of providing an application on an application controller comprising a controller display; executing the application to retrieve a user input into the application controller; executing logic to render an output; and displaying the output on at least one of the controller display and the remote display.

24 Claims, 6 Drawing Sheets

FIG. 1

| Mode | Process | | | |
|---|---|---|---|---|
| | Retrieve User Input | Perform Application Logic | Render Application Output | Display Devices |
| 1 - Mirror | Applications Controller | Applications Controller | Applications Controller | Applications Controller and Remote Display |
| 2 – Dual Render | Applications Controller | Applications Controller | Applications Controller | Applications Controller |
| | | | Remote Display | Remote Display |
| 3 - Controller | Applications Controller | Applications Controller | Remote Display | Remote Display |
| 4 – Server Render | Applications Controller | Server | Server | Remote Display |
| 5 – Display Render | Applications Controller | Server | Remote Display | Remote Display |
| 6 – Remote Display | Applications Controller | Remote Display | Remote Display | Remote Display |

METHOD AND SYSTEM FOR REMOTE GAME DISPLAY

CROSS-REFERENCE TO RELATED APPLICATIONS

The present application claims all benefits of and priority to Provisional Patent Application Ser. No. 61/471,008, entitled Systems and Methods for Motion-Based Media Control, filed on Apr. 1, 2011 and incorporates the disclosure of this provisional application by reference in its entirety.

The present application claims all benefits of and priority to Provisional Patent Application Ser. No. 61/471,068, entitled Systems and Methods for Remote Applications Display, filed on Apr. 1, 2011 and incorporates the disclosure of this provisional application by reference in its entirety.

The present application claims all benefits of and priority to Provisional Patent Application Ser. No. 61/471,131, entitled Systems and Methods for Optical-Based Media Control, filed on Apr. 2, 2011 and incorporates the disclosure of this provisional application by reference in its entirety.

The present application claims all benefits of and priority to Provisional Patent Application Ser. No. 61/471,133, entitled Systems and Methods for Media Synchronization, filed on Apr. 2, 2011 and incorporates the disclosure of this provisional application by reference in its entirety.

The present application claims all benefits of and priority to Provisional Patent Application Ser. No. 61/481,972, entitled Systems and Methods for Media Synchronization, filed on May 3, 2011 and incorporates the disclosure of this provisional application by reference in its entirety.

BACKGROUND

Currently video games can be played on various smartphones. However, a draw back to playing such games is the small video display of the smartphone. New approaches are needed to display media content, such as a video game, when using the smartphone or other touch screen devices.

SUMMARY

Various embodiments provide an application controller for interfacing to a remote display. The application controller can comprise a controller display; a process to retrieve a user input; a process to perform application logic; a process to render an application output; and an interface to communicate the output to a remote display. The controller can comprise a first mode configured to display the output mirrored on the controller display and the remote display. The controller can comprise a second mode configured to display a portion of the output on the controller and the entire output on the remote display. The controller can comprise a third mode configured to display the output on the remote display. The controller can comprise a fourth mode configured to send the output from a server to the remote display. The server can reside on the remote display Various embodiments provide a method of interfacing an application controller with a remote display. The method can include the steps of providing an application on an application controller comprising a controller display; executing the application to retrieve a user input entered into the application controller; executing logic using the input to render an output; and displaying the output on at least one of the controller display and the remote display.

Various embodiments provide a software application for interfacing an application controller with a remote display. The software application can comprise a process to retrieve a user input; a process to perform an application logic; a process to render an application output; and a process to communicate the output to a remote display.

DRAWINGS

The present disclosure will become more fully understood from the specification and the accompanying drawings, wherein.

DESCRIPTION

The following description is merely exemplary in nature and is in no way intended to limit the various embodiments, their application, or uses. As used herein, the phrase "at least one of A, B, and C" should be construed to mead a logical (A or B or C), using a non-exclusive logical or. As used herein, the phrase "A, B and/or C" should be construed to mean (A, B, and C) or alternatively (A or B or C), using a non-exclusive logical or. It should be understood that steps within a method may be executed in different order without altering the principles of the present disclosure.

The drawings described herein are for illustrative purposes only of selected embodiments and not all possible implementations, and are not intended to limit the scope of any of the various embodiments disclosed herein or any equivalents thereof. It is understood that the drawings are not drawn to scale. For purposes of clarity, the same reference numbers will be used in the drawings to identify similar elements.

The various embodiments may be described herein in terms of various functional components and processing steps. It should be appreciated that such components and steps may be realized by any number of hardware components configured to perform the specified functions. For example, various embodiments may employ various media content devices, video displays, streaming content sources, gaming software, and the like, which may carry out a variety of functions under the control of one or more control systems or other control devices. In addition, the embodiments may be practiced in any number of media content contexts and that the various embodiments relating to a method and system for media synchronization, as described herein are merely indicative of exemplary applications for the invention. For example, the principles, features and methods discussed may be applied to any media source and/or video gaming device.

Various embodiments provide media control systems configured to control various aspects of the media center through the use of a controller. In one embodiment, the hand-held controller is a smart phone comprising an app configured for communication between the smart phone and the media center. In an aspect of this embodiment the controller can emulate a game controller pad to allow user to control an object and/or a character in a videogame. In one embodiment, the controller is a tablet, such as, for example, an iPad, comprising an app configured for communication between the tablet and media center. In one embodiment the controller is a personal data assistant ("PDA") comprising an application configured for communication between the PDA and a media center.

In various embodiments, a system synchronizes a controller to media content. Media content refers to any information such as entertainment, news, business applications, games, educational programming, advertising, sports, conferencing, or other applications that can be sent through, for example, the Internet, over the air, satellite, cable, cellular networks, telephony systems, compact disk, digital video disk and/or other delivery medium.

In various embodiments, a system provides for one or more application controllers to display applications on one or more remote displays. Applications can include games, educational applications, business applications, voice over Internet protocol (VoIP), utilities, video and/or audio playback, such as, for example, video on demand, Pandora®, Netflix®, and Hulu™, word processing, video projection, web conferencing, or other applications or services. An applications controller can enable a user to enter commands, controls, and/or inputs, and to view the rendering of the images or pictures. An intermediary device such as a server can establish a coupling through a network between the applications controllers and remote displays to show, for example, rendered images of a video game on the remote displays in addition to, or instead of, the applications controller displays. The applications controller can establish a coupling with the remote displays without an intermediary device. The remote displays can differ from the applications controller displays in characteristics such as physical dimensions, for example, height, width, diagonal, resolution, aspect ratio, refresh rate, luminance, dot pitch, response time, contrast ratio, and/or viewing angle. By coupling the applications controllers with the remote displays, the user can enhance the viewing experience, for example, by easier viewing of the video, sharing the images with other viewers, enabling multiple users to participate, and/or providing more audio and/or video effects.

An application such as video or computer game can be an electronic activity involving interaction with one or more players through user interfaces that can include user input devices and output on one or more video and/or audio devices. Applications can employ a loop architecture in software that performs three main processes: (a) retrieve user input; (b) perform application logic; and (c) render application output. The loop can be executed aperiodically, periodically, or when a change is detected or calculated.

User or player input can be through a device such as a keyboard, a touchscreen, a joystick, a trackball, a touchpad, a mouse, or any combination thereof. The user input is processed and/or buffered by the retrieve user input process for use in the perform application logic process.

The perform application logic process can execute application logic, artificial intelligence, and/or physics to determine the action at a particular point in the application. For example, the application logic can analyze the factors involved in making movements in a game and send new coordinates for the game characters and locations to the render application process.

The results of the user input and execution of the application logic are used by the render application process to generate the next frame of video, which can be similar to animation, for the application. The render application process can be the graphics engine for the application. The generated images can be drawn in a buffer area then copied to the visible display.

Each of the processes can perform its functions whenever sufficient input information is available. For example, processes can perform their functions serially, in parallel, simultaneously, or in an overlapping manner. A system performing the processes can implement one or more processes in any combination of programmed digital processor logic circuits and/or analog control circuits. Inter-process communication can be accomplished in any conventional manner, such as, for example, subroutine calls, pointers, stacks, common data areas, messages, interrupts, asynchronous signals, synchronous signals. For example, the render application process can be performed by the applications controller, server, and/or remote display and each can perform other processes of the remote display system as described herein.

Various embodiments provide an application controller for interfacing to a remote display. The controller comprising a touch screen; a process to retrieve a user input; a process to perform an application logic; a process to render an application output; and an interface to communicate the output to a remote display. The controller can comprise a first mode configured to display the output mirrored on the touch screen and the remote display. The controller can comprise a second mode configured to display a portion of the output on the touch screen and the entire output on the remote display. The controller can comprise a third mode configured to display the output on the remote display. The controller can comprise a fourth mode configured to send the output from a server to the remote display. In some embodiments, the touch screen is configured to enter a user input. In some embodiments, the process to perform an application logic can perform the process using the user input, and in one embodiment, can perform the process using additional inputs, such as, for an example, an input from the game environment, and/or an input from a second user.

In some embodiments, the touch screen controls and displays a character in a portion of a game environment and the remote display displays the entire game environment. In some embodiments, a second touch screen controls a second character in a second portion of the game environment and the remote display displays the entire game environment. In some embodiments, the touch screen is configured to be a game controller and the remote display is configured as a game environment. In one embodiment, the touch screen is configured to change a configuration of the game controller when the remote display changes the game environment.

In one embodiment, media content is resident on the controller and the media content is displayed on the remote display. The media content can be a video game and the remote display displays the video output of the game and the controller can be a game pad configured to play the game.

Various embodiments provide a method of interfacing an application controller with a remote display. The method can include the steps of providing an application on an application controller comprising a touch screen; executing the application to retrieve a user input into the application controller; executing logic to render an output; and displaying the output on at least one of the application controller and the remote display.

In some embodiments, the method can include the step of mirroring the output on the touch screen and the remote display. In some embodiments, the method can include the step of displaying a portion of the output on the touch screen and the entire output on the remote display.

In some embodiments, the executing logic to render an output can be performed on a server in communication with the application controller and the remote display. The method can include the step of displaying the output on the remote display. The touch screen can control and display a character in a portion of a game environment and the remote display can display the entire game environment. In one embodiment, a second touch screen can control a second character in a second portion of the game environment and the remote display can display the entire game environment.

Various embodiments provide a software application for interfacing an application controller with a remote display. The software application can comprise a process to retrieve a user input; a process to perform an application logic; a process to render an application output; and a process to communicate the output to a remote display.

In some embodiments, the application can comprise a routine to broadcast the input to a server via a wireless network. The server can comprise the process to perform an application logic; the process to render an application output; and the process to communicate the output to a remote display. In some embodiments, the application controller can comprise the process to retrieve a user input; the process to perform an application logic; the process to render an application output; and the process to communicate the output to a remote display.

In various embodiments, the remote applications display system can allow a user to control a game on a television by rendering the output of the game in the application controller or in server and then streaming the output of the game to the television. In one embodiment, user can play a game on the application controller display the output of the game on a television via a network or via a device to device link, such as, for example, Bluetooth. In an aspect of this embodiment, any media content, such as, a movie, a feed from a server, music, and the like can be located on the application controller and then streamed to the remote display.

In various embodiments, the remote applications display system can allow a plurality of users to play a game head to head and display the game environment on the remote display. In such embodiments, each user has an applications controller on which the user controls their character or object in the game environment. Only the portion of the game environment needed to play is displayed on the user's application controller, while the entire game environment for the particular level of the game is view by all of the plurality of users on the remote display. For example, the plurality of users could be playing a car racing game. Each of the users would control their car from their application controller and the portion of the racetrack contain all of the user's car can be viewed on the remote display. In another example, a user can play a puzzle game, on the system and have the ability to view the whole puzzle on the remote display and to magnify a portion of the game board in the applications controller.

Various embodiments provide an application controller for interfacing to a remote display. The controller can comprise a controller display; a process to retrieve a user input; a process to perform an application logic using the user input; a process to render an application output; and an interface to communicate the output to a remote display.

The controller can include a first mode configured to display the output mirrored on the controller display and the remote display. The controller can include a second mode configured to display a portion of the output on the controller display and the entire output on the remote display. The controller can include a third mode configured to display the output on the remote display. The controller can include a fourth mode configured to send the output from a server to the remote display. In some embodiments, the controller display is a touch screen.

In some embodiments, the controller display controls and displays a character in a portion of a game environment and the remote display displays the entire game environment. A second controller display can control and display a second character in a second portion of the game environment and the remote display can display the entire game environment.

In some embodiments, the controller display displays a first perspective of a game environment and the remote display displays a second perspective of the game environment. In one embodiment, a second controller display third perspective of a game environment and the remote display displays a second perspective of the game environment.

In some embodiments, the media content is resident on the controller and the media content is displayed on the remote display. The media content can be a video game and the remote display can display the video output of the game and the controller can be configured to display game controls.

In various embodiments, the controller can comprise a first mode configured to display the output mirrored on the controller display and the remote display; a second mode configured to display a portion of the output on the controller display and the entire output on the remote display; a third mode configured to display the output on the remote display; a fourth mode configured to send the output from a server to the remote display; and a command to select any of the first mode, the second mode, the third mode, and the fourth mode.

Various embodiments provide a method of interfacing an application controller with a remote display. The method can include the steps of providing an application on an application controller comprising a controller display; executing the application to retrieve a user input into the application controller; executing logic to render an output; and displaying the output on at least one of the controller display and the remote display.

The method can include the step of mirroring the output on the controller display and the remote display. The method can include the step of displaying a portion of the output on the controller display and the entire output on the remote display. The method can include the step of executing logic to render an output is performed on a server in communication with the application controller and the remote display. The method can include the step of displaying the output on the remote display.

In some embodiments, the application controller controls and displays a character in a portion of a game environment and the remote display displays the entire game environment. In some embodiments, an application controller controls a second character in a second portion of the game environment and the remote display displays the entire game environment.

In some embodiments, the method can include the steps of displaying a first perspective of a game environment on the application controller; and displaying a second perspective of the game environment on the remote display. In some embodiments, the method can include the steps of displaying a third perspective of a game environment on the application controller; and displaying a second perspective of the game environment on the remote display. The method can include the step of configuring application controller to display game controls.

Various embodiments can provide a software application for interfacing an application controller with a remote display. The soft application can comprise a process to retrieve a user input; a process to perform an application logic; a process to render an application output; and a process to communicate the output to a remote display. The application can include a routine to broadcast the input to a server via a wireless network. In some embodiments, the server comprises the process to perform an application logic; the process to render an application output; and the process to communicate the output to a remote display In some embodiments, the application controller comprises the process to retrieve a user input; the process to perform an application logic; the process to render an application output; and the process to communicate the output to a remote display. The application can include a routine to configure the application controller to display game controls.

As described herein, a remote display can be one or more remote displays. In some embodiments, a plurality of remote displays can display the same output. In some embodiments, a plurality of remote displays can display different outputs. In some embodiments, a plurality of remote displays can be changed between displaying the same output and displaying different outputs. In some embodiments, a server may reside on an application controller. In some embodiments, a server may reside on the in the remote display. In some embodiments, the server is in communication with the applications controller and the remote display.

Various embodiments of system 100, as illustrated in FIG. 1-6, can perform the functions and/or achieves the results of the systems and methods for remote applications display. System 100 includes at least one applications controller 102, network 104, at least one remote display 106, and server 108. Applications controller 102 can be a device with a display, network interface and user input capability, such as, for example, a touchscreen, a keypad, a trackball, a mouse, a voice command, or other user input device, or combinations thereof. The applications controller can be a dedicated control device or a device that performs functions in addition to applications control, such as, for example, a smartphone, mobile phone, cellular phone, personal digital assistant, tablet computer, netbook computer, personal pocket computer or universal remote. The applications controller network interface can be through a cellular provider, wireless local area network or other communications protocol, such as, WiFi™, WiMax, Bluetooth®, HiperLAN, IrDA, or wired connection, such as, Ethernet.

Figure 1:
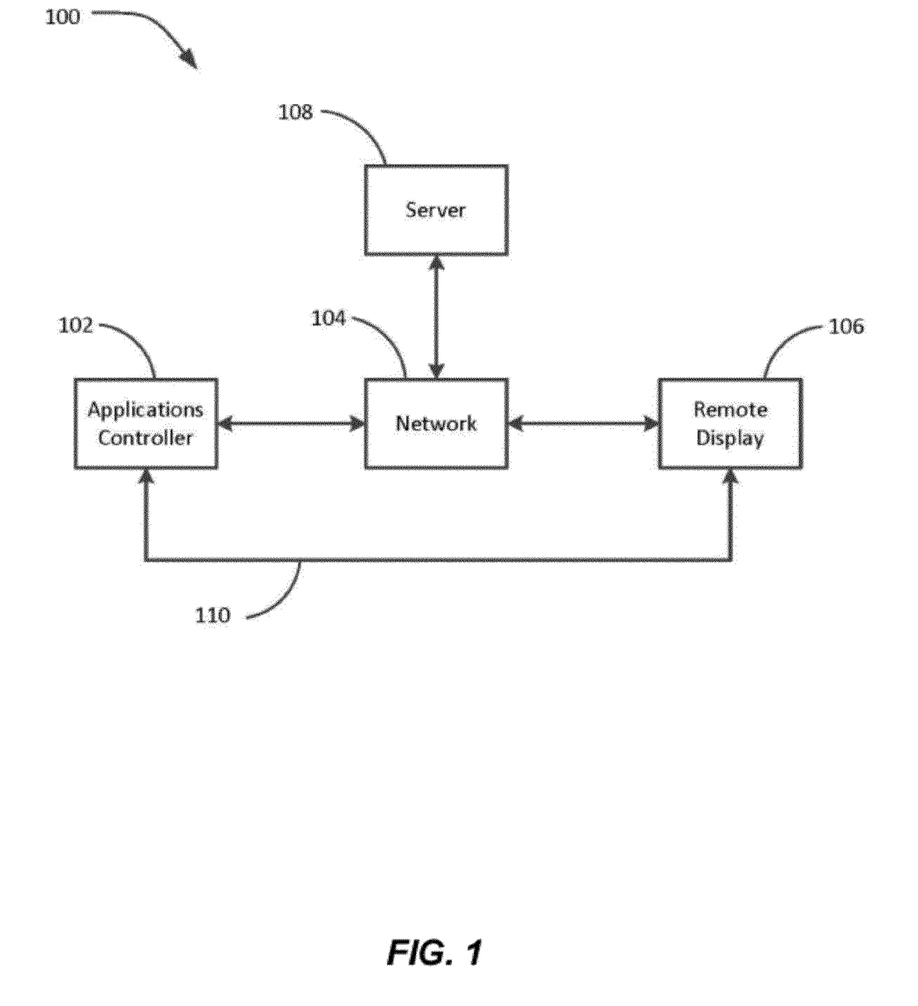
FIG. 1 is a functional block diagram illustrating a remote applications display system according to various embodiments.

Application software resident or loaded on the controller 102 establishes a connection to the remote display 106 either directly or through an intermediary device, such as, for example, a computer server 108 on a network 104. In one embodiment, application software may be resident or pre-installed on the controller. In one embodiment, application software may be loaded, downloaded, or installed on the controller. In one embodiment, a portion of the application software may be resident or pre-installed on the controller and the remainder of the application software may be loaded, downloaded, or installed on the controller at a later point in time, such as, for example, upon connection to a game to be played on the media center, or upon payment for use of the software application, or held temporarily on the controller based on a subscription.

In some embodiments, the controller 102 can be a smartphone, a mobile phone, a cellular phone, a PDA, a tablet computer, a netbook computer, a personal pocket computer, a universal remote controller, an iPad, an Android based tablet, or any similar device now known or developed in the future. In various embodiments, the controller 102 comprises an interactive touch video screen, a means to connect to a cloud, and a means to run the application software.

In some embodiments, the remote display 106 can be a home theatre, an entertainment system, a cinema, a video game device, or any similar device now known or developed in the future. In some embodiments, the intermediary device can be a computer server, computer program running a service, a computer dedicated to running a service, hardware/software system or any similar device now known or developed in the future. In some embodiments, a network can be a radio network, a cellular network, the Internet, a local area network ("LAN"), a wide area network ("WAN"), or any similar device now known or developed in the future.

The remote display 106 can have application software resident or loaded to enable coupling with applications controller 102 directly through pathway 110 or through network 104 and server 108, where coupling is an electronic communication connection, link or pathway between two or more devices to facilitate exchange of information, data or commands. The remote display 106 can have application software resident or loaded to enable coupling with applications controller 102 through network 104 and server 108. The remote display 106 can have application software resident or loaded to enable coupling with applications controller 102 directly through pathway 110. The remote display 106 can have application software resident or loaded to enable coupling with applications controller 102 directly through pathway 110 and through network 104 and server 108. Remote display 106 can provide information such as its location, device name, serial number, electronic identification number, IP address, Media Access Control (MAC) address, and/or other characteristics to register with server 108 enabling a coupling to be established with applications controller 102.

Remote display 106 can also provide identification in, for example, a bar code that can be read from a label or a display by a camera on an applications controller. Applications 102 controller can determine the address or identification information of remote display 106 through discovery protocols, such as, Domain Name System Service Discovery (DNS-SD), Service Location Protocol (SLP), Simple Service Discovery Protocol (SSDP), Universal Description Discovery and Integration (UDDI), Bluetooth Service Discovery Protocol (SDP), or Web Services Dynamic Discovery (WS-Discovery).

In operation, a user can select application software (or "app") on the applications controller 102. Prior to running the application, or during execution, the user can invoke the remote applications display app on applications controller 102 and enter one or more remote display 106 identifying characteristics described herein or the identifying characteristics can be resident on applications controller 102 from an earlier entry. An app on applications controller 102 can establish communications with server 108 and provide 108 server with one or more identifying characteristics of remote display 106. Server 108 can search a database to match the information provided by applications controller 102 with a remote display 106 recorded in the database. If no match is found, server 108 can query remote displays 106 on one or more networks 104 then can, match the information provided by applications controller 102.

Once remote display 106 is identified by server 108, information can be passed to applications controller 102, or maintained by server 108, to establish a coupling between applications controller 102 and remote display 106 through network 104, through server 108 on network 104, or directly between applications controller 102 and remote display 106. Alternatively, applications controller 102 can establish communications directly with remote display 106 by determining the remote display's address through a service discovery protocol or direct entry of an address as described herein.

The application processes can be performed on applications controller 102, server 108, and/or remote display 106. The user can have the option of selecting which processes are performed on each device. The application processes performed by server 108 can be performed by applications controller 102 or by remote display 106. The selection of which devices perform which processes can be predetermined or determined by an algorithm. The algorithm can be executed by a processor on one or more of the devices based on, for example, network throughput, processing speed, processor utilization, and/or other factors. Operating modes can be selected to enable processes to be executed on particular devices.

Figure 2:
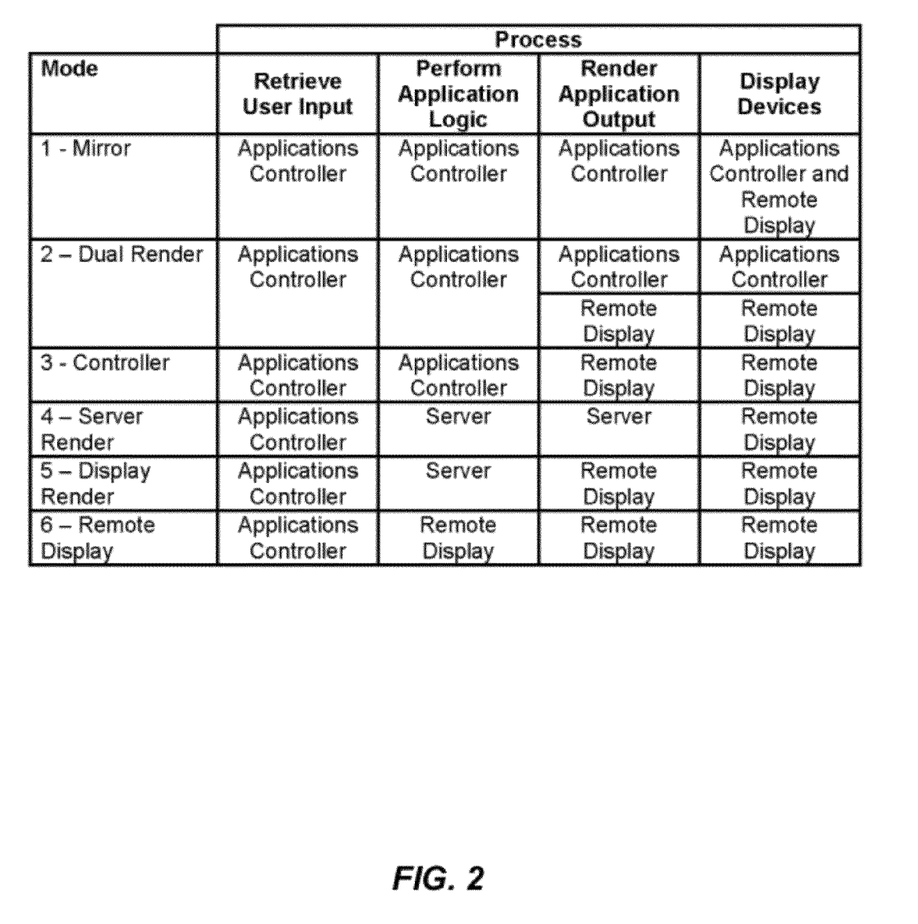
FIG. 2 is a table illustrating various operating modes of a remote applications display system illustrated in FIG. 1.
Figure 3:
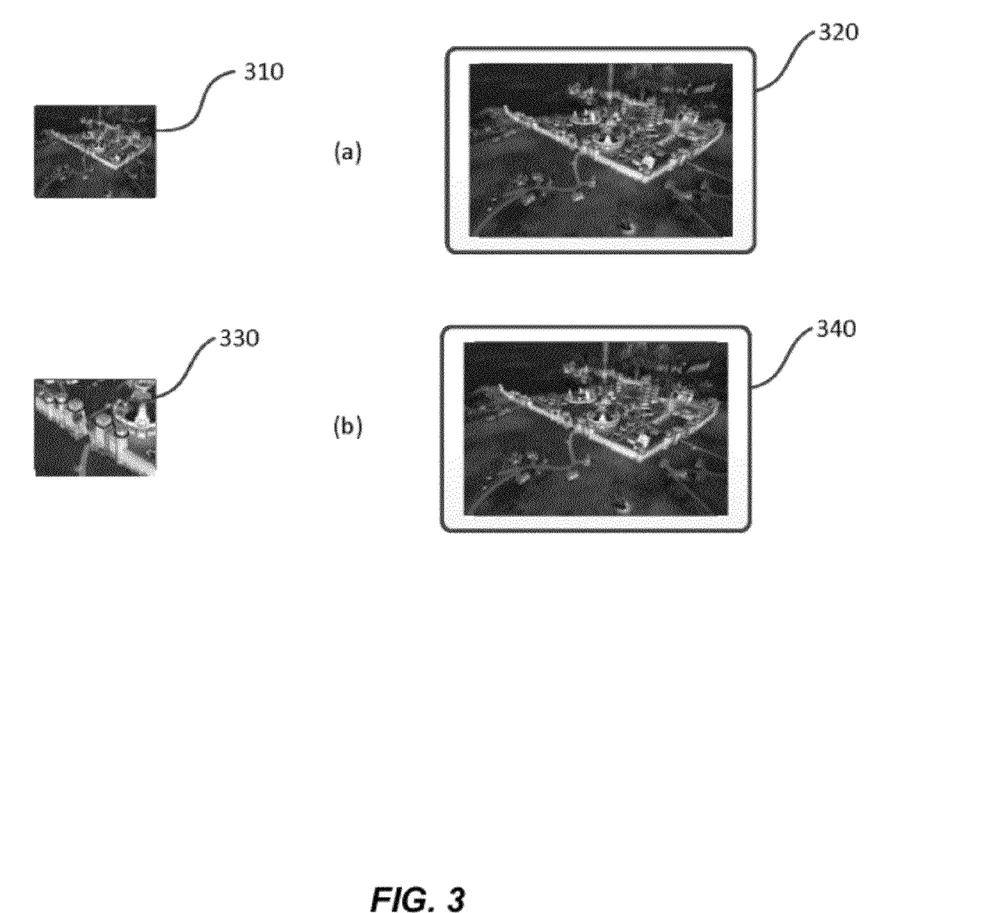
FIG. 3 is a representation of image rendering on applications controller displays and remote displays of a remote applications display system illustrated in FIG. 1.

For example and as illustrated in FIG. 2, Mode 1, Mirror, can perform all three processes described herein on applications controller 102. The render application process is performed on applications controller 102 and the applications controller display 310 can be mirrored on remote display 106. The images seen on applications controller 102 can be the same as those seen on remote display 106. As illustrated in FIG. 3, applications controller display 310 and remote display image 320 provide an example of Mode 1 by presenting similar views although at different sizes and resolutions.

Mode 2, Dual Render, can have both applications controller 102 and remote display 106 performing the render application output process. Rendering by different devices can enable images to differ. For example, the remote display 106 can be larger in terms of physical dimensions, resolution and/or aspect ratio allowing more of the application's visual environment to be viewed. In Mode 2, applications controller display 330 can present a portion of the image presented by remote display image 340.

Applications controller 102 can perform the retrieve user input and perform application logic processes in Mode 3, Applications controller 102, while remote display 106 performs the render application output process. Less network bandwidth can be required in Mode 3 since coordinate updates, image changes, and/or other information can be provided to remote display 106 rather than fully rendered images.

Server 108 can perform the application logic and render application output processes. Server 108 can have higher processing speeds and can accept and integrate application inputs from multiple applications controllers. Mode 4, Server Render, can execute the perform application logic and render application output processes in server 108. The images can be sent from server 108 to remote display 106 for viewing.

Mode 5, Render Display, can have each device performing one process. Applications controller 102 can perform the retrieve user input process, server 108 can perform the application logic process, and remote display 106 can perform the render application output process and display the image.

Remote display 106 can perform the application logic and render application output processes in Mode 6, Remote Display, while applications controller 102 retrieves user input. In this mode, the communications between applications controller 102 and remote display 106 may be limited to user inputs and/or other command or control information.

The user can switch modes, terminate remote display, or perform other functions to control applications and remote display 106 by entering commands in the app running on applications controller 102, server 108, and/or remote display 106.

Figure 4:
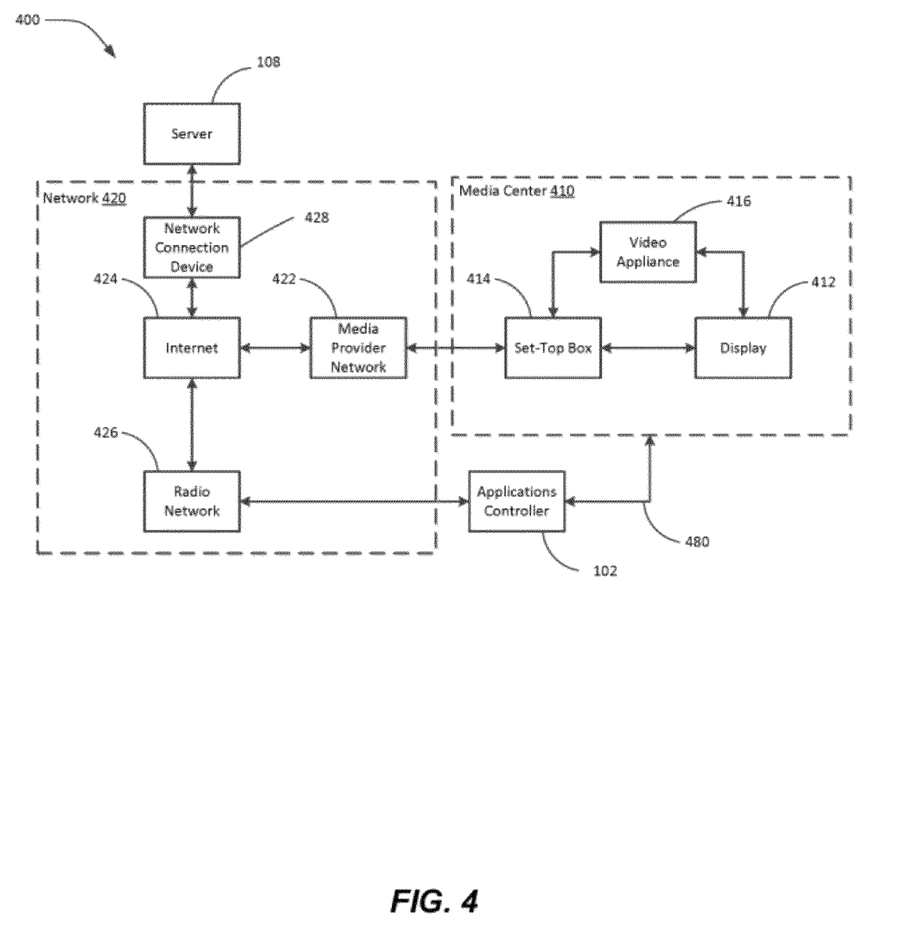
FIG. 4 is a block diagram illustrating a remote applications display, according to one embodiment.

One embodiment of system 100, illustrated as system 400 in FIG. 4, performs the functions and/or achieves the results of the systems for remote applications display. Media center 410 performs the functions of remote display 106, as described herein. Media center 410 can include set-top box 414, display 412, and video appliance 416. The functions of set-top box 414, video appliance 416 and display 412 can be combined in any combination into one or more devices. For example, a network-enabled digital television can provide the functionality of set-top box 414, video appliance 416 and display 412 in a single unit. In another example, a digital video recording receiver can provide the functionality of set-top box 414 and video appliance 416 in a single device.

Network 420 performs functionality of network 104, as described herein. Set-top box 414 receives content and apps from network 420 and sends and receives data to or from network 420. Content can include media, multimedia, entertainment, news, educational and informational programming. Content can be provided by cable, satellite, over-the-air broadcast, the Internet or other sources. Apps provide software for installation and/or execution on the set-top box to provide additional functionality. The apps can include business software, educational software, entertainment software and other application software in addition to a remote applications display app. Data provides for the two-way communication of information from set-top box 414 to remote locations and devices.

Video appliance 416 can provide record, storage, playback and distribution capability. Video appliance 416 can include a digital video recorder (DVR), video distribution controller, video player, such as, for example, a video cassette recorder, DVD or Btu-Ray player, media computer, audio/video server or other audio and video functionality. In some embodiments, video appliance 416 can have the capability of receiving and executing apps.

Display 412 provides the user with visual images. Display 412 can be of any display type or technology, such as, for example, a television, a monitor, a computer display, a projector, a cathode ray tube (CRT), a front projection, a rear projection, a plasma, a liquid crystal display (LCD), a light emitting diode (LED), a digital light processing (DLP). Display 412 can be of any size, resolution or refresh rate.

Media center 410 couples with Internet 424 through media provider network 422. Media provider network 422 can be a cable provider, digital subscriber line (DSL) provider, satellite provider or other Internet access service or device.

Applications controller 102 can connect to Internet 424 through radio network 426. Radio network 426 can be a cellular provider, satellite provider or other wireless access technology or service such as WiFi or WiMAX. Applications controller 102 can also couple directly with media center 410 through wired or wireless pathway 480 as described herein. Pathway 480 can perform the functionality of pathway 110, as described herein.

Server 108 connects with Internet 424 through network connection device 428. Network connection device 428 can be a network interface card, hub, network switch, router, bridge, gateway, modem or other network connection device.

Applications controller 102, server 108, and/or media center 410 can perform the retrieve user input, perform application logic and/or render application output processes. User or software selections determine which processes run on which devices.

System 400 can include more than one applications controller 102, allowing multiple users to use one or more applications. Additional applications controllers 102 can connect through radio network 426 or through another device to access Internet 424. Media center 410 can also couple directly, through network 420, or through server 108 and network 420 to multiple applications controllers 102.

Figure 5:
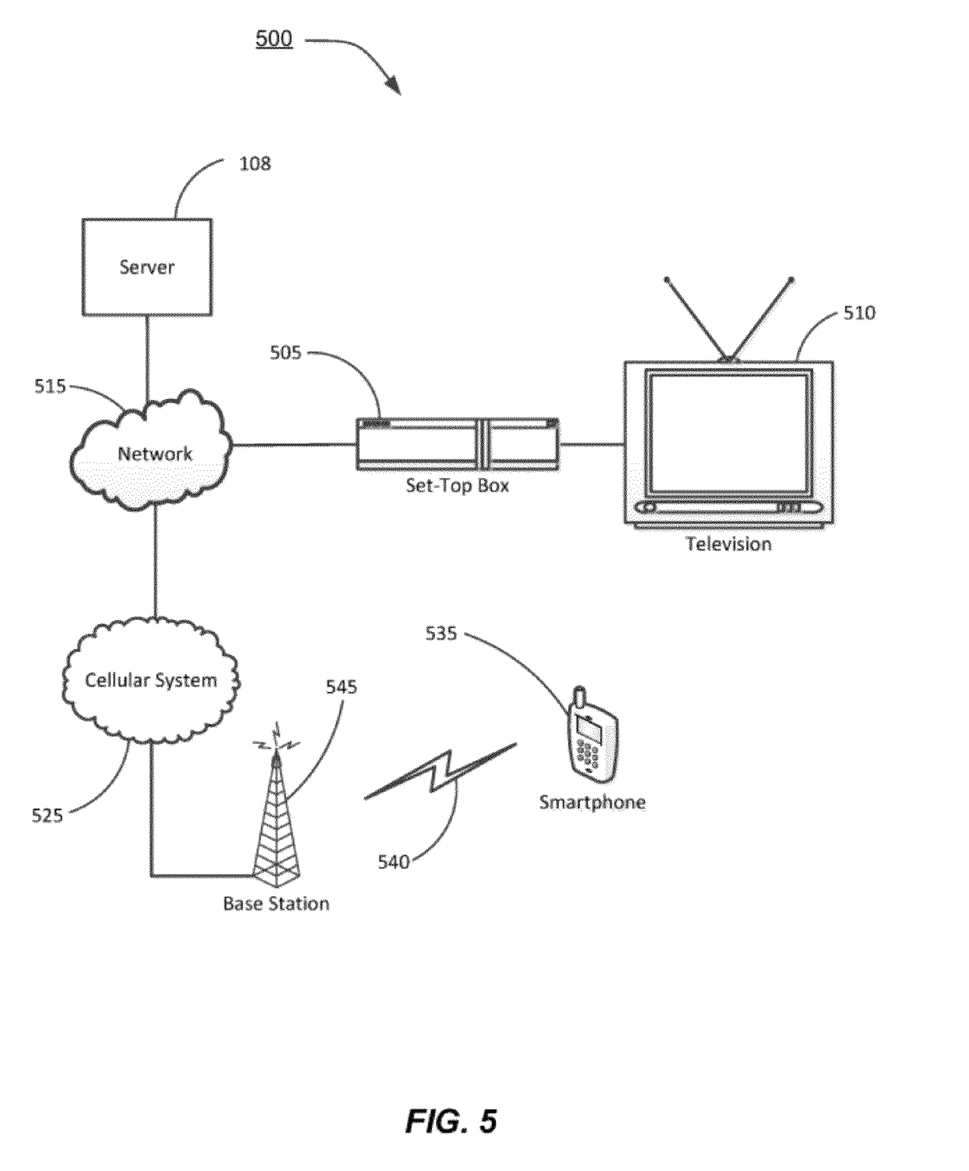
FIG. 5 is a block diagram illustrating a remote applications display system employing a television and set-top box, according to one embodiment.

One embodiment of system 100, illustrated as system 500 in FIG. 5, includes server 108, television 510, smartphone 535, network 515, set-top box 505 and cellular system 525. Television 510 performs the functions of remote display 106, as described herein, and can be coupled to network 515 through set-top box 505. Smartphone 535 performs the functions of applications controller 102, as described herein, and couples to network 515 through radio link 540, base station 545, and cellular system 525. Cellular system 525 couples to network 515. Server 108 couples to network 515. Network 515 performs the functions of network 104 providing a network of networks to interconnect local and dispersed computers and computing equipment.

Smartphone 535 can provide a platform for applications and can include the retrieve user input, perform application logic, and render application output processes. As described herein, the user establishes a coupling with television 510 by entering the information into an app on smartphone 535 to identify television 510 by server 108. Once the coupling is established, smartphone 535 can communicate with television 510 through server 108, through network 515 without traversing server 108, or directly with 510 without traversing network 515. The user can select the operating mode prior to or during execution of an application. The operating mode can select the device that executes each application process, such as render application output on television 510 and retrieve user input and perform application logic on smartphone 535, or another combination of devices and processes. Television 510 or set-top box 505 can perform the remote applications display app and/or any of the remote applications display app processes.

Figure 6:
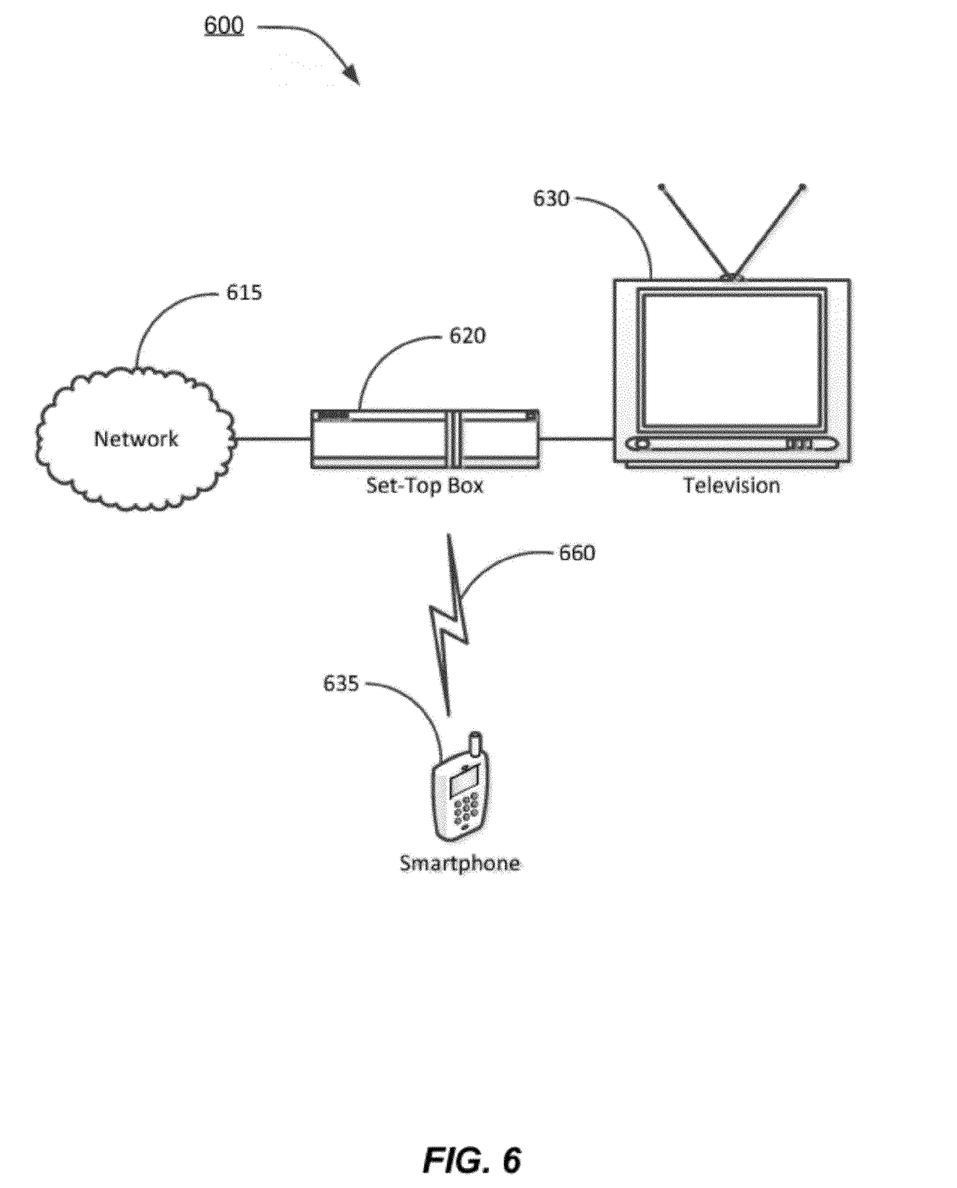
FIG. 6 a block diagram illustrating a remote applications display system, according to one embodiment.

One embodiment of system 100, illustrated as system 600 in FIG. 6, performs the functions of the present invention without a server. System 600 includes smartphone 635, television 630, and set-top box 620. Smartphone 635 performs the functions of applications controller 102 and couples directly to set-top box 620 via wireless link 660 after the user retrieves the information from, or enters the information into, the applications controller, to establish the coupling. Set-top box 620 and/or television 630 perform the functions of remote applications display 106. The retrieve user input process can be performed by smartphone 635 while set-top box 620 or television 630 can execute the perform application logic and render applications output processes. Other arrangements of processes can be assigned by the user through the remote applications display app on smartphone 635, set-top 620 and/or television 630 through user selection.

Upon establishment of the coupling between smartphone 635 and television 630 through server 108, communications can occur directly between smartphone 635 and television 630 over interface 516. Interface 660 can be by any wired or wireless means. For example, interface 660 can be through and/or with a cloud, a LAN, a WAN, a PAN, radio, a network, Bluetooth, infrared, optical, acoustic, cellular, a hot spot, and combinations thereof.

As used herein, the terms "comprise", "comprises", "comprising", "having", "including", "includes" or any variation thereof, are intended to reference a non-exclusive inclusion, such that a process, method, article, system, composition or apparatus that comprises a list of elements does not include only those elements recited, but may also include other elements not expressly listed or inherent to such process, method, article, system, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

In the foregoing specification, the invention has been described with reference to specific embodiments. Various modifications and changes may be made, however, without departing from the scope of the various embodiments of the present invention, as set forth in the claims. The specification and Figures are illustrative, rather than restrictive, and modifications are intended to be included within the scope of any of the various embodiments, of the present invention described herein. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus or system claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The invention claimed is:

1. An application controller comprising a controller display and configured for interfacing to a remote display, the controller comprising:
   a process to configure the application controller to couple to and communicate directly with a remote display to establish a first interface and to couple and communicate with a network linked to a server and to the remote display to establish a second interface:
   a process to retrieve a user input from the controller display;
   a process to perform an application logic using the user input to render an application output; and to send the output over the first interface to communicate the output from the application controller to the remote display; and
   a process to send the user input over the second interface to a server configured to perform the application logic using the use input to render the application output and to send the output from a server to the remote display.

2. The controller according to claim 1, further comprising a mode configured to display the output mirrored on the controller display and the remote display.

3. The controller according to claim 1, further comprising a mode configured to display a portion of the output on the controller display and the entire output on the remote display.

4. The controller according to claim 3, wherein the controller display controls and displays a character in a portion of a game environment and the remote display displays the entire game environment.

5. The controller according to claim 4, wherein a second controller display controls and displays a second character in a second portion of the game environment and the remote display displays the entire game environment.

6. The controller according to claim 3, wherein the controller display displays a first perspective of a game environment and the remote display displays a second perspective of the game environment.

7. The controller according to claim 6, wherein a second controller display third perspective of Rail the game environment and the remote display displays Rail the second perspective of the game environment.

8. The controller according to claim 1, wherein in the controller display is a touch screen.

9. The controller according to claim 8, wherein media content is resident on the controller and the media content is displayed on the remote display.

10. The controller according to claim 9, wherein the media content is a video game and the remote display displays the video output of the game and the controller is configured to display game controls.

11. The controller according to claim 1, further comprising:
    a first mode configured to display the output mirrored on the controller display and the remote display;
    a second mode configured to display a portion of the output on the controller display and the entire output on the remote display;
    a third mode configured to display the output on the remote display;
    a fourth mode configured to send the output from a server to the remote display; and
    a command to select any of the first mode, the second mode, the third mode, and the fourth mode.

12. The application controller of claim 1, wherein the remote display is a single screen displaying a single game comprising movements controlled by the application controller.

13. A method of interfacing an application controller with a remote display, the method comprising:
    providing an application on an application controller comprising a controller display;
    configuring the application controller to couple to and communicate directly with a remote display to establish a first interface and to couple and communicate with a network linked to a server and to the remote display to establish a second interface;
    executing the application to retrieve a user input into the application controller;
    executing logic to render an output, wherein the executing logic to render an output is performed on at least one of the application controller and a server in communication with the application controller and the remote display;
    communicatin the output to the remote display over at least one of the first interface and the second interface; and
    displaying the output on the remote display.

14. The method according to claim 13, further comprising mirroring the output on the controller display and the remote display.

15. The method according to claim 13, further comprising displaying a portion of the output on the controller display and the entire output on the remote display.

16. The method according to claim 15, further comprising
    displaying a first perspective of a game environment on the application controller; and
    displaying a second perspective of the game environment on the remote display.

17. The method according to claim 16, further comprising
    displaying a third perspective of the game environment on the application controller; and
    displaying the second perspective of the game environment on the remote display.

18. The method according to claim 15, wherein the application controller controls and displays a character in a portion of a game environment and the remote display displays the entire game environment.

19. The method according to claim 18, wherein a second application controller controls a second character in a second portion of the game environment and the remote display displays the entire game environment.

20. The method according to claim 13, further comprising configuring application controller to display game controls.

21. An electronic media comprising a software application for interfacing an application controller comprising a controller display and configured with a remote display, the application is configured to be downloaded by the application controller and provide:
    a process to configure the application controller to couple to and communicate directly with a remote display to establish a first interface and to couple and communicate with a network linked to a server and to the remote display to establish a second interface;
    a process to retrieve a user input from the controller display;
    a process to perform an application logic using the user input to render an application output and communicate the output from the application controller to a remote display over the first interface; and
    a process to send the user input to a server and to communicate an application output from the server to the remote display over the second interface.

22. The application according to claim 21, further comprising a routine to broadcast the input to a server over the second interface via a wireless network.

23. The application according to claim 22, wherein the server comprises the process to perform an application logic using the user input to render the application output.

24. The application according to claim 21, further comprising a routine to configure the application controller to display game controls.

* * * * *

UNITED STATES PATENT AND TRADEMARK OFFICE
CERTIFICATE OF CORRECTION

PATENT NO. : 9,089,768 B2  Page 1 of 1
APPLICATION NO. : 13/437748
DATED : July 28, 2015
INVENTOR(S) : Mark Vange It is certified that error appears in the above-identified patent and that said Letters Patent is hereby corrected as shown below:

In the claims

In column 12 at line 38, In Claim 1, change "interface:" to --interface;--.

In column 12 at line 48, In Claim 1, change "use" to --user--.

In column 13 at line 2, In Claim 7, after "of" delete "Rail".

In column 13 at line 3, In Claim 7, after "displays" delete "Rail".

In column 13 at line 47 (approx.), In Claim 13, change "communicatin" to --communicating--.

Signed and Sealed this
Thirty-first Day of May, 2016

Michelle K. Lee
*Director of the United States Patent and Trademark Office*